United States Patent
Sun et al.

(10) Patent No.: US 9,812,712 B2
(45) Date of Patent: Nov. 7, 2017

(54) HIGHLY DISPERSIBLE GRAPHENE COMPOSITION, PREPARATION METHOD THEREOF, AND ELECTRODE FOR LITHIUM ION SECONDARY BATTERY CONTAINING HIGHLY DISPERSIBLE GRAPHENE COMPOSITION

(71) Applicant: Toray Industries, Inc., Chuo-ku, Tokyo (JP)

(72) Inventors: Peiyu Sun, Shanghai (CN); Zhenqi Wu, Shanghai (CN); Gangqiao Liu, Shanghai (CN); Gang Wu, Shanghai (CN); Eiichiro Tamaki, Shiga (JP); Yasuo Kubota, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/430,267

(22) PCT Filed: Sep. 22, 2013

(86) PCT No.: PCT/CN2013/083920
§ 371 (c)(1),
(2) Date: Mar. 23, 2015

(87) PCT Pub. No.: WO2014/044210
PCT Pub. Date: Mar. 27, 2014

(65) Prior Publication Data
US 2015/0249250 A1    Sep. 3, 2015

(30) Foreign Application Priority Data
Sep. 24, 2012    (CN) .......................... 2012 1 0359340

(51) Int. Cl.
| | | |
|---|---|---|
| H01B 1/04 | (2006.01) | |
| C01B 31/02 | (2006.01) | |
| H01M 4/96 | (2006.01) | |
| B82Y 30/00 | (2011.01) | |
| H01M 4/62 | (2006.01) | |
| H01M 10/0525 | (2010.01) | |
| C01B 31/04 | (2006.01) | |
| H01M 4/58 | (2010.01) | |

(52) U.S. Cl.
CPC .......... *H01M 4/625* (2013.01); *C01B 31/043* (2013.01); *C01B 31/0438* (2013.01); *H01M 4/5825* (2013.01); *H01M 4/623* (2013.01); *H01M 10/0525* (2013.01); *C01B 2204/04* (2013.01); *C01B 2204/32* (2013.01)

(58) Field of Classification Search
CPC ........... H01B 1/04; C01B 31/02–31/04; C01B 31/0469–31/0476; C01B 31/043; C01B 31/0438; C01B 31/0484; C01B 31/0423; B82Y 30/00; B82Y 40/00; H01M 4/583; H01M 4/625
USPC .............. 252/500–511; 423/445 R–448, 460; 977/734, 753
See application file for complete search history.

(56) References Cited

U.S. PATENT DOCUMENTS 8,894,886 B1    11/2014  Luhrs

FOREIGN PATENT DOCUMENTS

| CN | 101987729 | 3/2011 |
|---|---|---|
| CN | 102142541 | 8/2011 |
| CN | 102226951 | 10/2011 |
| JP | 2011190151 | 9/2011 |

OTHER PUBLICATIONS

Wang ("Sulfur-graphene composite for rechargeable lithium batteries." J of Power Sources, 196, pp. 7030-7034, online Oct. 7, 2010).*
Liu ("Reduction of Graphene Oxide by Thiourea." Journal of Nanoscience and Nanotechnology, vol. 11, pp. 10082-10086, 2011).*
International Search Report and Written Opinion of the International Searching Authority for International Application No. PCT/CN2013/083920 dated Jan. 2, 2014.
Liu, Y., et al., "Reduction of graphene oxide by thiourea," 2011, pp. 10082-10086, vol. 11, Journal of Nanoscience and Nanotechnology.
Su, Q., et al., "Composites of graphene with large aromatic molecules," 2009, pp. 3191-3195, vol. 21, Advanced Materials.
Wang, H., et al., "LiMn1-xFexPO4 Nanorods grown on graphene sheets for ultrahigh-rate-performance lithium ion batteries," 2011, pp. 7364-7368, vol. 50, Angewandte Chemie International Edition.
Extended European Search Report for European Application No. 13839137.0 dated Mar. 23, 2016.
Chua, C.K., et al., Graphene oxide reduction by standard industrial reducing agent: thiourea dioxide, Apr. 27, 2012, pp. 11054-11061, vol. 22(22), Journal of Materials Chemistry.

* cited by examiner

*Primary Examiner* — Tri V Nguyen
(74) *Attorney, Agent, or Firm* — RatnerPrestia

(57) ABSTRACT

In order to prepare highly conductive and highly dispersible graphene and obtain an electrode for a lithium ion battery with good output characteristics and cycle characteristics, there is provided a graphene composition containing thiourea, the element ratio of sulfur to carbon being 0.04 or more and 0.12 or less in X-ray photoelectron spectroscopy measurement.

6 Claims, No Drawings

HIGHLY DISPERSIBLE GRAPHENE COMPOSITION, PREPARATION METHOD THEREOF, AND ELECTRODE FOR LITHIUM ION SECONDARY BATTERY CONTAINING HIGHLY DISPERSIBLE GRAPHENE COMPOSITION

CROSS REFERENCE TO RELATED APPLICATIONS

This application is the U.S. National Phase application of PCT International Application No. PCT/CN2013/083920, filed Sep. 22, 2013, and claims priority to Chinese Patent Application No. 201210359340.4, filed Sep. 24, 2012, the disclosures of each of these applications being incorporated herein by reference in their entireties for all purposes.

FIELD OF THE INVENTION

The present invention relates to a highly dispersible and highly conductive graphene composition, the preparation method thereof, and a lithium ion secondary battery containing the same. More particularly, it relates to a graphene composition whose dispersibility is enhanced by allowing thiourea to be contained and an electrode for a lithium ion secondary battery imparted with high conductivity by allowing the graphene to be contained as a conductive additive.

BACKGROUND OF THE INVENTION

A lithium ion secondary battery (hereinafter, sometimes referred to as a lithium ion battery) is a secondary battery capable of attaining higher voltage and higher energy density compared to the conventional nickel-cadmium battery and nickel metal hydride battery, and since this enables the battery to become smaller in size and lighter in weight, it has been widely used for information-related mobile communication electronic equipment such as mobile phones and laptop personal computers. With regard to the lithium ion secondary battery, it is thought that the opportunity of being utilized for onboard use in which the battery is incorporated into electric vehicles, hybrid electric vehicles and the like or industrial use such as use in electric power tools will further increase in the future, and attaining further highly enhanced capacity and highly enhanced output has been eagerly desired.

The lithium ion secondary battery is composed of positive and negative electrodes having at least an active material capable of reversibly releasing and occluding lithium ions, a separator which is arranged in a container and separates the positive electrode from the negative electrode, and the container being charged with a non-aqueous electrolyte solution.

The positive electrode is prepared by applying an electrode agent containing an active material, a conductive additive and a binding agent to a metal foil current collector made of aluminum and the like and subjecting it to pressure forming. As the current positive electrode active material, a powder of composite oxides of lithium and a transition metal (hereinafter, sometimes referred to as lithium metal oxides) such as lithium cobaltate ($LiCoO_2$), lithium nickelate ($LiNiO_2$), lithium manganate ($LiMnO_2$), or a ternary system material in which a portion of cobalt is substituted with nickel and manganese ($LiMn_xNi_yCo_{1-x-y}O_2$), and spinel type lithium manganate ($LiMn_2O_4$) has been used relatively frequently. Since these materials contain a so-called rare earth element, there is a problem in terms of cost and stable supply.

In recent years, olivine-based materials (phosphate-based materials) with a high level of safety have been attracting attention, and above all, lithium iron phosphate ($LiFePO_4$) containing iron which is one of the abundant resources and is inexpensive has begun to be put into practical use. Moreover, lithium manganese phosphate ($LiMnPO_4$) with a high level of output energy has also been attracting attention as a next-generation active material. Separately, metal oxides such as $V_2O_5$, metallic compounds such as $TiS_2$, $MoS_2$ and $NbSe_2$, and the like have also been utilized.

Moreover, the negative electrode is prepared, as in the case of the positive electrode, by applying an electrode agent containing an active material, a conductive additive and a binder agent to a metal foil current collector made of copper and the like and subjecting it to pressure forming. Generally, examples of the active material for the negative electrode include lithium metal, lithium alloys such as a Li—Al alloy and Li—Sn, silicon compounds in which SiO, SiC, SiOC and the like are the basic constituent elements, conductive polymers prepared by doping lithium into polyacetylene, polypyrrole and the like, intercalation compounds prepared by allowing lithium ions to be incorporated into crystals, carbon materials such as natural graphite, artificial graphite and hard carbon, and the like.

In the ingredients of these positive and negative electrodes, the conductive additive plays a role in attaining an efficient conduction path from an active material to a current collector and is an essential constituent material to the electrode for a lithium ion battery.

However, when the content of the conductive additive is high, the battery capacity per weight of the electrode is lowered. Therefore, it is preferred that the amount of the conductive additive should be as small as possible, and there is a need for a conductive additive with high conductivity capable of securing the conductivity with a smaller amount thereof. Moreover, in recent years, there are many active materials that have not been put into practical use in spite of their high capacity since the conductivity thereof is low, for example, an olivine-based positive electrode active material, a solid solution-based active material and the like. In this respect, there is a need for a conductive additive with high conductivity.

Examples of the material conventionally used as a conductive additive include acetylene black, ketjen black and the like. Since these are inexpensive and have reasonable dispersibility, but have low crystallinity, their electrical conductivity is lower than that of graphite or the like and it is necessary to allow them to be incorporated in large quantities.

On the other hand, it is thought that since graphene has high conductivity, a shape of high aspect ratio and a large number of particles per unit weight, it has high potential as a conductive additive.

Graphene is one of two-dimensional crystals composed of carbon atoms and has been attracting attention since it was discovered in 2004. Graphene has excellent electrical, thermal, optical and mechanical properties and has a broad range of possible applications in the fields such as battery materials, energy storage materials, electronic devices and composite materials. If the potential of graphene is brought out, there is a possibility that a lithium ion battery electrode with high capacity and high output can be prepared when graphene is used as a conductive additive.

Examples of the preparation method of graphene include a mechanical exfoliation method, a chemical vapor deposition method, an epitaxial crystal growth method and an oxidation-reduction method. With regard to the former three methods (the mechanical exfoliation method, the chemical vapor deposition method and the epitaxial crystal growth method), the productivity is low and the mass production is difficult. On the other hand, since the oxidation-reduction method has the potential of mass production and further has the merit of being easy to perform chemical modification, it has been attracting attention.

The oxidation-reduction method presently proposed employs a heat reduction method, a method of using hydrazines and other organic compounds as a reducing agent or the like, and reduces a graphene oxide to prepare graphene.

Graphene is a type of nanocarbon and is usually less apt to be dispersed. Accordingly, for effectively utilizing graphene as a conductive additive for a lithium ion battery, the technique of dispersing graphene well is necessary.

In Non-Patent Document 1, an example of utilizing graphene for an electrode for a lithium ion battery is disclosed. In Non-Patent Document 2, an example of enhancing the dispersibility by adding a dispersing agent to graphene is disclosed. In Non-Patent Document 3 and Patent Document 1, examples of preparing graphene by reducing a graphene oxide with thiourea are disclosed.

PATENT DOCUMENT

Patent Document 1: Chinese Patent No. 201110072746.X (corresponding to CN 102226951 A)

NON-PATENT DOCUMENTS

Non-Patent Document 1: Wang H., et al. Angewandte Chemie International Edition, 2011, 50, 7364
Non-Patent Document 2: Su Q, et al. Advanced Materials, 2009, 21, 3191
Non-Patent Document 3: Liu Y, et al. Journal of Nanoscience and Nanotechnology Carbon, 2011, 11, 10082

SUMMARY OF THE INVENTION

As described above, graphene is a nanocarbon and is very difficult to be dispersed due to its high specific surface area.

In Non-Patent Document 1, the performance of the positive electrode is enhanced by directly combining graphene and a positive electrode active material. However, the performance cannot be sufficiently exerted as a conductive additive by taking advantage of high aspect ratio of graphene, since graphene fails to be imparted with dispersibility.

In Non-Patent Document 2, the dispersibility is enhanced by adding pyrene sulfonic acid as a dispersing agent to graphene. In this method, since large amount of pyrene sulfonic acid covers surfaces due to stacking interaction, the conductivity is lowered.

In Non-Patent Document 3 and Patent Document 1, although graphene is prepared by reducing a graphene oxide with thiourea, attention is not paid to the dispersibility of graphene and almost no thiourea is contained in the final product.

In this way, there has been no disclosure about an example in which graphene is imparted with high dispersibility and is successfully employed as a conductive additive for a lithium ion battery electrode up to the present time.

The first object of the present invention is to prepare highly conductive and highly dispersible graphene. The second object is to obtain an electrode for a lithium ion battery with good output characteristics and cycle characteristics by utilizing highly conductive and highly dispersible graphene.

As a result of extensive research, the present inventors have found that highly conductive and highly dispersible graphene can be obtained by allowing thiourea to be moderately contained in graphene and imparting graphene with dispersibility.

That is, the present invention includes
(1) a graphene composition containing thiourea, the element ratio of sulfur to carbon measured in X-ray photoelectron spectroscopy measurement being 0.04 or more and 0.12 or less,
(2) an electrode for a lithium ion battery, including the graphene composition of (1), an electrode active material and a binder,
(3) a method for producing graphene composition, including a step of reducing a graphene oxide at 20° C. or higher and 60° C. or lower in the presence of thiourea,
(4) the method for producing graphene composition of (3), wherein a graphene oxide is reduced at a weight ratio of thiourea to the graphene oxide of 0.5 or more and 4 or less, and
(5) an electrode for a lithium ion battery, comprising a graphene composition produced by the method of (3) or (4), an electrode active material and a binder.

The graphene composition according to the present invention can be imparted with dispersibility while maintaining high conductivity by allowing thiourea to be moderately distributed over the graphene surface. Furthermore, by using such highly dispersible and highly conductive graphene together with a binder and an electrode active material, it is possible to provide an electrode for a lithium ion battery with excellent discharge performance.

DETAILED DESCRIPTION OF EMBODIMENTS OF THE INVENTION

<Graphene Composition>

The graphene in the present invention preferably has a structure composed of single-layer graphene sheets stacked together and has a flaky form. Although no particular restriction is put on the thickness of the graphene, it is preferably 100 nm or less, more preferably 50 nm or less and further preferably 20 nm or less. With regard to the size in the aspect direction of the graphene, the lower limit is preferably 0.5 µm or more, more preferably 0.7 µm or more and further preferably 1 µm or more and the upper limit is preferably 50 µm or less, more preferably 10 µm or less and further preferably 5 µm or less. In this connection, the size in the aspect direction of the graphene refers to an average of the maximum length of the major axis and the minimum length of the minor axis of the graphene plane.

<Thiourea>

The graphene composition according to embodiments of the present invention contains thiourea. Thiourea is a molecule with a structure in which the oxygen atom of urea has been replaced by a sulfur atom. That is, it follows that the graphene composition containing thiourea contains the sulfur element on its surface in a certain proportion.

In order to set the amount of thiourea on the surface of the graphene composition to an appropriate amount, it is necessary to allow the element ratio of sulfur to carbon in X-ray photoelectron spectroscopy to be 0.04 or more and 0.12 or less. Moreover, it is preferred that the element ratio of sulfur to carbon be 0.06 or more and 0.10 or less. In case where the proportion of thiourea on the surface is too small, it is not possible to impart the graphene composition with dispersibility. On the other hand, in case where the proportion of thiourea is too large, the conductivity of the graphene composition is lowered. In X-ray photoelectron spectroscopy, the surface of a sample put into an ultra-high vacuum is irradiated with soft X-rays and photoelectrons emitted from the surface are detected by an analyzer. The binding energy value of a bound electron in a material is obtained from the wide spectrum of the photoelectron and information about the elements in the material is obtained from the binding energy value. Furthermore, it is possible to quantitatively determine the element ratio using the peak area ratio.

The method of allowing thiourea to be contained is not particularly limited. In order to prepare the graphene composition, thiourea and graphene may be mixed or a graphite oxide may be reduced in the presence of thiourea.

No particular restriction is put on the method of mixing thiourea and graphene and a known mixer and kneader may be used. Specifically, examples thereof include a method of utilizing a self-operating mortar, a triple roll mill, a bead mill, a planetary ball mill, a homogenizer, a planetary mixer, a biaxial kneader or the like. Of these, a planetary ball mill is suitable for mixing two different powders.

The specific method of reducing a graphite oxide in the presence of thiourea will be described later.

Although the X-ray photoelectron spectroscopy is used for the surface analysis of the graphene composition, in order to determine the thiourea content in the whole graphene composition as well as the surface, it is preferred that thermal desorption GC-MS and TPD-MS analysis be used. These methods enable the qualitative and quantitative determination of a component that volatilizes when heat is applied to the composition. The thiourea content in the graphene composition is preferably 0.002 or more and 0.04 or less, further preferably 0.005 or more and 0.02 or less, relative to the carbon component.

In this connection, it is possible to determine whether thiourea is contained in the graphene composition also by a TOF-SIMS method. In the TOF-SIMS method, the surface of a sample put into an ultra-high vacuum is irradiated with a pulsed ion (primary ion) and ions emitted from the sample surface (secondary ions) are mass analyzed to analyze a material on the sample surface. By analyzing the graphene composition containing thiourea by this method, peaks derived from the molecular weight of thiourea are obtained.

The graphene composition according to the present invention may contain a material other than thiourea; and may contain, for example, a denatured material of thiourea and the elemental sulfur. The denatured material of thiourea and the elemental sulfur, as well as thiourea, can be subjected to the qualitative and quantitative determination by methods of analysis such as thermal desorption GC-MS and TPD-MS. Since the ionic conductivity is especially enhanced in case where the elemental sulfur is contained in the graphene composition, allowing the elemental sulfur to be contained is preferred. The elemental sulfur content in the graphene composition is preferably 0.01 or more and 0.1 or less, further preferably 0.02 or more and 0.05 or less, relative to the carbon component.

<Graphite Oxide>

The graphite oxide in the present invention is preferably a material obtained by allowing graphite to be oxidized and has a peak at 9 to 13.0° which is peculiar to graphite oxide in the X-ray diffraction measurement. With regard to such a graphite oxide, since the structure collapses depending on the conditions such as pH in the solution and one-layer to few-layer sheets are formed depending on the degree of oxidation, it is sometimes referred to also as a graphene oxide.

The graphite oxide can be prepared by a known method. Moreover, commercial graphite oxide may be purchased. Although the graphite as the raw material of the graphite oxide may be either artificial graphite or natural graphite, natural graphite is preferably used. The mesh number for the graphite raw material is preferably 20000 or less, further preferably 5000 or less.

Although the preparation method of a graphite oxide is not particularly limited and a known method may be used, Hummers' method and the like are preferred. An example of Hummers' method will be mentioned below. To graphite (for example a powder of natural graphite and the like) as the raw material, concentrated sulfuric acid, sodium nitrate and potassium permanganate are added and allowed to undergo a reaction with stirring for 0.2 to 5 hours at 25 to 50° C. Afterward, the reaction mixture is added and diluted with deionized water to obtain a suspension and this is continuously allowed to undergo a reaction for 5 to 50 minutes at 80 to 100° C. Finally, hydrogen peroxide and deionized water are added and allowed to undergo a reaction for 1 to 30 minutes to obtain a graphite oxide dispersion. The resulting graphite oxide dispersion is filtered and washed to obtain a graphite oxide gel. The solvent can be removed from the graphite oxide gel by a freeze-drying method, a spray-dry method or the like to obtain a graphite oxide powder.

The specifications given for each reactant are, as an example, relative to 10 g of natural graphite powder, 150 to 300 ml of concentrated sulfuric acid, 2 to 8 g of sodium nitrate, 10 to 40 g of potassium permanganate and 40 to 80 g of hydrogen peroxide. When concentrated sulfuric acid, sodium nitrate and potassium permanganate are added, the temperature is controlled by means of an ice bath. When hydrogen peroxide and deionized water are added, the mass of deionized water is 10 to 20 times the mass of hydrogen peroxide. With regard to concentrated sulfuric acid, the mass concentration is 70% or more and it is preferred to utilize that with a mass concentration of 97% or more.

Although the graphite oxide has high dispersibility, since it is an insulator in itself, it cannot be used as a conductive additive or the like. In case where the degree of oxidation of the graphite oxide is too high, the conductivity of the graphene powder obtained by being reduced may deteriorate. As such, it is preferred that the ratio of carbon atoms to oxygen atoms in the graphite oxide be 0.5 or less. Moreover, in case where the inner part of graphite is not well oxided, it becomes difficult to obtain a flaky graphene powder. Accordingly, it is desirable that the peaks peculiar to graphite not be detected when the graphite oxide is subjected to the X-ray diffraction measurement.

<Reduction of Graphite Oxide in the Presence of Thiourea>

The graphene composition according to the present invention may be produced by reducing a graphite oxide in the presence of thiourea.

In order to reduce graphite oxide in the presence of thiourea, thiourea and graphite oxide only need to be moderately mixed. For example, the graphite oxide and thiourea may be mixed in the state of being dispersed in a solution. In this case, it is preferred that both the graphite oxide and thiourea be completely dissolved. If a portion thereof may be left undissolved, it is also acceptable. As the solvent, a polar solvent is preferred, but not limited to the following. Examples thereof include water, ethanol, methanol, 1-propanol, 2-propanol, N-methylpyrrolidone, dimethylformamide, dimethylacetamide, dimethyl sulfoxide, γ-butyrolactone and the like. In order to reduce graphite oxide in the presence of thiourea, the solvent is not always necessary as long as the graphite oxide and thiourea are moderately mixed. Those in the solid state may be mixed by kneading. The graphite oxide and thiourea may be in the liquid state and in the solid state respectively, or thiourea and the graphite oxide may be in the liquid state and in the solid state respectively.

The graphite oxide may be reduced with thiourea as a reducing agent and may be reduced with a reducing agent other than thiourea. In the case where thiourea is used as a reducing agent, the graphite oxide and thiourea are dissolved to prepare an aqueous solution, and the graphite oxide is reduced by heating in some cases. In the case where it is reduced with a reducing agent other than thiourea in the presence of thiourea, examples of the reducing agent include sodium dithionite, potassium dithionite, phosphorous acid, sodium borohydride, hydrazine and the like. Among the reducing agents, sodium dithionite and potassium dithionite, which are capable of reducing the graphite oxide readily at ambient temperature, are especially preferred. Without using the reducing agent, it may be reduced with a reducing gas such as hydrogen. In the case where it is reduced with a reducing agent other than thiourea, the amount of the reducing agent is not particularly limited and as long as the reductive reaction can be performed, there is no problem. In the case where thiourea is used as a reducing agent, since the amount of thiourea left on the graphene surface is affected, there is a favorable range of the amount of thiourea. The favorable range will be described later.

The temperature of the reductive reaction in a production method for the graphene composition according to the present invention is preferably 20° C. or higher and 60° C. or lower. When the reduction temperature is lower than 20° C., it is difficult to reduce the graphite oxide and in the case where it is reduced at a higher temperature than 60° C. (for example 95° C.), since thiourea is apt to be eliminated in the solution, it is difficult to allow thiourea to be present on the graphene surface moderately.

Thiourea may be adsorbed on the graphene surface without suffering denaturation, reaction or the like; or may take part in the reductive reaction of the graphite oxide and may be denatured. Since an amino group is present in thiourea, there is a possibility of reacting with a carboxyl group, and for example, it is presumed that an amide bond may be formed from a carboxyl group in the graphite oxide and the amino group in thiourea. Moreover, the elemental sulfur is generated when thiourea is oxidized and this elemental sulfur may remain on the graphene surface.

Although the weight ratio of thiourea to the graphite oxide is not particularly limited, since the amount of thiourea and a denatured material of thiourea left on the graphene surface are affected, it is preferably 0.5 or more and 4 or less, further preferably 1 or more and 3 or less. In the case where thiourea is used as a reducing agent, since a portion of thiourea is decomposed, the weight ratio of thiourea to the graphite oxide is preferably 0.7 or more and 4 or less, further preferably 1.2 or more and 3 or less. By reducing the graphite oxide in the presence of thiourea, the dispersibility of graphene is enhanced by allowing thiourea and/or a denatured material thereof to be adsorbed on or combined with the graphene surface. When the weight ratio of thiourea to the graphite oxide is smaller than 0.5, the dispersibility tends to be lowered and when larger than 4, the conductivity tends to be lowered since the amounts of thiourea and a denatured material thereof adsorbed on the surface of the graphene composition become too large.

As stated above, the graphene composition containing thiourea and the graphene composition prepared by reducing the graphene oxide at 20° C. or higher and 60° C. or lower in the presence of thiourea have high dispersibility and it is possible to allow them to be suitably dispersed especially in a polar solvent. The solvent suitable for the dispersion is exemplified by N-methylpyrrolidone, γ-butyrolactone, dimethylformamide, dimethylacetamide and the like. Having high dispersibility in these solvents enables them to be preferably used as materials for a battery.

<Electrode for Lithium Ion Battery>

A conductive additive is usually contained in an electrode for a lithium ion battery. By using the graphene composition containing thiourea according to the present invention as a conductive additive together with an electrode active material and a binder, it becomes possible to prepare an electrode for a lithium ion battery with excellent battery characteristics.

The conductive additive may be composed of only the graphene composition according to the present invention or other materials may be added. Although other conductive additives to be added are not particularly limited, examples thereof include carbon blacks such as furnace black, ketjen black and acetylene black; graphites such as natural graphite (scalelike graphite and the like) and artificial graphite; conductive fibers such as carbon fiber and metal fiber; metal powders such as copper, nickel, aluminum and silver powders, and the like.

The electrode active material is roughly classified into a positive electrode active material and a negative electrode active material. In either case, the present invention may be utilized.

The positive electrode active material is not particularly limited, examples thereof include composite oxides of lithium and a transition metal such as lithium cobaltate ($LiCoO_2$), lithium nickelate ($LiNiO_2$), spinel type lithium manganate ($LiMn_2O_4$) or a ternary system material in which a portion of cobalt is substituted with nickel and manganese ($LiMn_xNi_yCo_{1-x-y}O_2$) and spinel type lithium manganate ($LiMn_2O_4$), olivine-based (phosphate-based) active materials such as lithium iron phosphate ($LiFePO_4$) and lithium iron phosphate ($LiFePO_4$), metal oxides such as $V_2O_5$, metallic compounds such as $TiS_2$, $MoS_2$ and $NbSe_2$, and the like.

The negative electrode active material is not particularly limited, examples thereof include carbon-based materials such as natural graphite, artificial graphite and hard carbon; silicon compounds in which SiO, SiC, SiOC and the like are the basic constituent elements; metal oxides such as manganese oxide (MnO) and cobalt oxide (CoO) which are capable of undergoing a conversion reaction with lithium ions, and the like.

The binder can be selected from fluorine-based polymers such as polyvinylidene fluoride (PVDF) and polytetrafluoroethylene (PTFE) and rubbers such as styrene-butadiene rubber (SBR) and natural rubber.

By mixing the active material, the binder polymer and the conductive additive with a suitable amount of solvent to prepare an electrode paste, applying the electrode paste to a current collector and drying it, an electrode for a lithium ion battery can be prepared. Examples of the solvent include N-methylpyrrolidone, γ-butyrolactone, dimethylacetamide and the like. And N-methylpyrrolidone is especially used frequently.

Since the graphene composition according to embodiments of the present invention is prepared by reduction reaction in the presence of thiourea, it has good dispersibility in an electrode paste solvent. As such, with regard to the electrode for a lithium ion battery according to the present invention, by allowing the graphene composition to be well dispersed in the electrode, it is possible to enhance the electron conductivity in the electrode and to provide an electrode for a lithium ion battery with excellent performance.

EXAMPLES

Measurement Example 1: Electrical Conductivity

By forming a sample into a disk-shaped specimen with a diameter of about 20 mm and a density of 1 g/cm$^3$, the electrical conductivity of the sample was measured using high resistivity meter MCP-HT450 and low resistivity meter MCP-T610 available from Mitsubishi Chemical Corporation.

Measurement Example 2: X-Ray Photoelectron Measurement

The X-ray photoelectron measurement for each sample was performed using Quantera SXM (available from ULVAC-PHI, Incorporated). The excited X-ray is a monochromatic Al K$\alpha_{1,2}$ (1486.6 eV), the diameter of X-ray is 200 μm, and the photoelectron take-off angle is 45 degree.

Measurement Example 3: Performance in Dispersibility

The performance in dispersibility was measured in the following manner. 1 part by weight of the graphene composition in the following Examples and 99 parts by weight of N-methylpyrrolidone were placed in a sample bottle, and the bottle was subjected to ultrasonication with an ultrasonic washer for 30 minutes, after which the sedimentation state was observed.

Measurement Example 4: Discharge Capacity

An electrode plate prepared in the following example was cut into pieces with a diameter of 15.9 mm to give a positive electrode, a sheet of lithium foil was cut into pieces with a diameter of 16.1 mm and a thickness of 0.2 mm to give a negative electrode, a sheet of Celgard #2400 (available from Celgard KK) was cut into pieces with a diameter of 17 mm to give a separator, a 1M LiPF$_6$-containing solvent of ethylene carbonate:diethyl carbonate=7:3 was employed as an electrolytic solution, and 2042 type coin battery was prepared to carry out the electrochemical evaluation. A charge and discharge measurement was performed 3 times at the rate of 1C, the upper limit voltage of 4.0 V and the lower limit voltage of 2.5 V, and the capacity at the third discharging was defined as the discharge capacity.

Synthesis Example 1

Preparation method of graphite oxide: A 1500-mesh natural graphite powder (Shang Hai Yi Fan Shi Mo Co., Ltd.) was employed as a raw material. 220 ml of 98% concentrated sulfuric acid, 3.5 g of sodium nitrate and 21 g of potassium permanganate were added to 10 g of the natural graphite powder in an ice bath, and the mixture was mechanically stirred for 1 hour. The temperature of the liquid mixture was maintained at 20° C. or lower. The liquid mixture was removed from the ice bath and was allowed to undergo a reaction with stirring for 4 hours in a water bath at 35° C., after which a suspension obtained by adding 500 ml of ion-exchanged water to the mixture was allowed to undergo a reaction for an additional 15 minutes at 90° C. Finally, 600 ml of ion-exchanged water and 50 ml of hydrogen peroxide were added to the reaction mixture, and a reaction was carried out for 5 minutes to obtain a graphite oxide dispersion. The dispersion was filtered while hot, the metal ions contained therein were washed off with dilute hydrochloric acid solution, the acid was washed off with ion-exchanged water and the washing was repeated until the pH had reached 7 to prepare a graphite oxide gel. After drying, graphite oxide was obtained. The elemental composition ratio of oxygen atoms to carbon atoms in the graphite oxide prepared above was determined to be 0.45.

Example 1

[Preparation of Graphene Oxide Dispersion]

The graphite oxide gel prepared in Synthesis Example 1 was diluted with deionized water to the concentration of 5 mg/ml and subjected to an ultrasonic treatment to obtain a homogeneously dispersed ocher graphene oxide dispersion.

[Preparation of Graphene Composition]

3 g of thiourea was added to 200 ml of the above graphene oxide dispersion. And it was allowed to undergo a reaction at a reductive reaction temperature of 40° C. for a reductive reaction period of 16 hours with a mechanical stirrer, after which the reaction mixture was filtered, washed with water and dried to obtain a graphene composition.

[Physical Properties and Performance of Graphene composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $9.01 \times 10^2$ S/m.

The element ratio of the graphene composition was measured according to Measurement Example 2, whereupon the element ratio of sulfur to carbon was determined to be 0.104.

The performance in dispersibility of the graphene composition was measured according to Measurement Example 3, whereupon it was allowed to be stably dispersed even after 30 days and no sedimentation was observed.

[Preparation of Electrode for Lithium Ion Battery]

An electrode for a lithium ion battery containing a graphene composition was prepared in the following way. With a planetary mixer, 1 part by weight of the prepared graphene composition, 90 parts by weight of lithium iron phosphate as an electrode active material, 4 parts by weight of acetylene black as a conductive additive, 5 parts by weight of polyvinylidene fluoride as a binder and 100 parts by weight of N-methylpyrrolidone as a solvent were mixed to obtain an electrode paste. The electrode paste was applied to a sheet of aluminum foil (18 in thickness) using a doctor blade (300 μm) and was dried at 200° C. for 15 minutes to obtain an electrode plate.

The discharge capacity was measured according to Measurement Example 4, whereupon it was determined to be 143 mAh/g.

The results are shown in Table 1.

Example 2

[Preparation of Graphene Oxide Dispersion]

A graphene oxide dispersion was obtained in the same manner as in Example 1.

[Preparation Method of Graphene Composition]

1 g of thiourea and 3 g of sodium dithionite were added to 200 ml of the above graphene oxide dispersion. And it was allowed to undergo a reaction at room temperature of 23° C. as the reductive reaction temperature for 1 hour as the reductive reaction period with a mechanical stirrer, after which the reaction mixture was filtered, washed with water and dried to obtain a graphene composition.

[Physical Properties and Performance of Graphene Composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $3.85 \times 10^3$ S/m.

The element ratio of the graphene composition was measured according to Measurement Example 2, whereupon the element ratio of sulfur to carbon was determined to be 0.078. The performance in dispersibility of the graphene composition was measured according to Measurement Example 3, whereupon it was allowed to be stably dispersed even after 30 days and no sedimentation was observed.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 151 mAh/g.

The results are shown in Table 1.

Example 3

[Preparation of Graphene Oxide Dispersion]

A graphene oxide dispersion was obtained in the same manner as in Example 1.

[Preparation Method of Graphene Composition]

1 g of thiourea and 3 g of potassium dithionite were added to 200 ml of the above graphene oxide dispersion. And it was allowed to undergo a reaction at room temperature of 23° C. as the reductive reaction temperature for 1 hour as the reductive reaction period with a mechanical stirrer, after which the reaction mixture was filtered, washed with water and dried to obtain a graphene composition.

[Physical Properties and Performance of Graphene Composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $3.71 \times 10^3$ S/m.

The element ratio of the graphene composition was measured according to Measurement Example 2, whereupon the element ratio of sulfur to carbon was determined to be 0.076.

The performance in dispersibility of the graphene composition was measured according to Measurement Example 3, whereupon it was allowed to be stably dispersed even after 30 days and no sedimentation was observed.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 150 mAh/g.

The results are shown in Table 1.

Example 4

[Preparation of Graphene Oxide Dispersion]

A graphene oxide dispersion was obtained in the same manner as in Example 1.

[Preparation Method of Graphene Composition]

1 g of thiourea and 3 g of hydrazine hydrate were added to 200 ml of the above graphene oxide dispersion. And it was allowed to undergo a reaction at 60° C. as the reductive reaction temperature for 1 hour as the reductive reaction period with a mechanical stirrer, after which the reaction mixture was filtered, washed with water and dried to obtain a graphene composition.

[Physical Properties and Performance of Graphene Composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $1.98 \times 10^3$ S/m.

The element ratio of the graphene composition was measured according to Measurement Example 2, whereupon the element ratio of sulfur to carbon was determined to be 0.053.

The performance in dispersibility of the graphene composition was measured according to Measurement Example 3, whereupon it was allowed to be stably dispersed even after 30 days and no sedimentation was observed.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 141 mAh/g.

The results are shown in Table 1.

Example 5

[Mixing of Graphene and Dispersing Agent]

5 g of Graphene Nanoplatelets (model number M-5, XG Sciences, Inc.) and 2 g of thiourea were mixed using a planetary ball mill, and then the mixture was washed with water and dried to obtain a graphene composition.

[Physical Properties and Performance of Graphene Composition]

The electrical conductivity of the graphene composition was measured according to Measurement Example 1, whereupon the electrical conductivity of the graphene composition was determined to be $3.56 \times 10^3$ S/m.

The element ratio of the graphene composition was measured according to Measurement Example 2, whereupon the element ratio of sulfur to carbon was determined to be 0.064.

The performance in dispersibility of the graphene composition was measured according to Measurement Example 3, whereupon it settled after 25 days.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 135 mAh/g.

The results are shown in Table 1.

Comparative Example 1

[Preparation of Graphene Oxide Dispersion]

A graphene oxide dispersion was obtained in the same manner as in Example 1.

[Preparation Method of Graphene Composition]

The above graphene oxide dispersion was diluted to 1 mg/ml. 150 ml of the diluted graphene oxide dispersion (1 mg/ml) and an aqueous thiourea solution prepared by dissolving 0.8 g of thiourea in 60 ml of water were mixed, and then the mixture was allowed to undergo a reaction at 95° C. for 8 hours, after which the reaction mixture was filtered, washed with water and dried to obtain a graphene composition.

[Physical Properties and Performance of Graphene Composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $1.25 \times 10^3$ S/m.

The element ratio of the graphene composition was measured according to Measurement Example 2, whereupon the element ratio of sulfur to carbon was determined to be 0.021.

The performance in dispersibility of the graphene composition was measured according to Measurement Example 3, whereupon the sedimentation was observed after 7 days.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 91 mAh/g.

The results are shown in Table 1.

Comparative Example 2

[Preparation of Graphene Oxide Dispersion]

A graphene oxide dispersion was obtained in the same manner as in Example 1.

[Preparation Method of Graphene composition]

The above graphene oxide dispersion was diluted to 1.5 mg/ml. 100 ml of the diluted graphene oxide dispersion (1.5 mg/ml) and an aqueous thiourea solution prepared by dissolving 1.2 g of thiourea in 100 ml of water were mixed, and then the mixture was allowed to undergo a reaction at 80° C. for 10 hours, after which the reaction mixture was filtered, washed with water and dried to obtain a graphene composition.

[Physical Properties and Performance of Graphene Composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $1.14 \times 10^3$ S/m.

The element ratio of the graphene composition was measured according to Measurement Example 2, whereupon the element ratio of sulfur to carbon was determined to be 0.023.

The performance in dispersibility of the graphene composition was measured according to Measurement Example 3, whereupon the sedimentation was observed after 6 days.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 90 mAh/g.

The results are shown in Table 1.

Comparative Example 3

[Preparation of Graphene Oxide Dispersion]

A graphene oxide dispersion was obtained in the same manner as in Example 1.

[Preparation Method of Graphene Composition]

3 g of hydrazine hydrate was added to 200 ml of the above graphene oxide dispersion. And it was allowed to undergo a reaction at 60° C. as the reductive reaction temperature for 10 hours as the reductive reaction period with a mechanical stirrer, after which the reaction mixture was filtered, washed with water and dried to obtain a graphene composition.

[Physical Properties and Performance of Graphene Composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $5.89 \times 10^3$ S/m.

The element ratio of the graphene composition was measured according to Measurement Example 2, whereupon the element ratio of sulfur to carbon was determined to be below 0.01.

The performance in dispersibility of the graphene composition was measured according to Measurement Example 3, whereupon the sedimentation was observed after 6 hours.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 90 mAh/g.

The results are shown in Table 1.

Comparative Example 4

[Preparation of Graphene Oxide Dispersion]

A graphene oxide dispersion was obtained in the same manner as in Example 1.

[Preparation Method of Graphene Composition]

3 g of sodium dithionite was added to 200 ml of the above graphene oxide dispersion. And it was allowed to undergo a reaction at room temperature of 23° C. as the reductive reaction temperature for 1 hour as the reductive reaction period with a mechanical stirrer, after which the reaction mixture was filtered, washed with water and dried to obtain a graphene composition.

[Physical Properties and Performance of Graphene Composition]

The electrical conductivity of the graphene composition before and after the reduction was measured according to Measurement Example 1. The electrical conductivity of the graphene oxide before the reduction was determined to be $8.70 \times 10^{-4}$ S/m and the electrical conductivity of the graphene composition after the reduction was determined to be $6.90 \times 10^3$ S/m.

The element ratio of the graphene composition was measured according to Measurement Example 2, whereupon the element ratio of sulfur to carbon was determined to be 0.013.

The performance in dispersibility of the graphene composition was measured according to Measurement Example 3, whereupon the sedimentation was observed after 1 day.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 113 mAh/g.

The results are shown in Table 1.

Comparative Example 5

[Preparation Method of Graphene Composition]

By heating the graphite oxide prepared in Synthesis Example 1 to 1000° C. under an argon atmosphere, it was reduced to obtain a graphene composition.

[Physical Properties and Performance of Graphene Composition]

The electrical conductivity of the graphene composition before and after the reduction was measured according to Measurement Example 1. The electrical conductivity of the graphite oxide before the reduction was determined to be $8.70 \times 10^{-4}$ S/m and the electrical conductivity of the graphene composition after the reduction was determined to be $1.59 \times 10^3$ S/m.

The element ratio of the graphene composition was measured according to Measurement Example 2, whereupon the element ratio of sulfur to carbon was determined to be below 0.01.

The performance in dispersibility of the graphene composition was measured according to Measurement Example 3, whereupon the sedimentation was observed after 6 hours.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 85 mAh/g.

The results are shown in Table 1.

Comparative Example 6

[Preparation Method of Graphene Composition]

As the graphene composition, Graphene Nanoplatelets (model number M-5, XG Sciences, Inc.) was employed.

[Physical Properties and Performance of Graphene Composition]

The electrical conductivity of the Graphene Nanoplatelets was measured according to Measurement Example 1, whereupon the electrical conductivity was determined to be $1.43 \times 10^4$ S/m.

The element ratio of the Graphene Nanoplatelets was measured according to Measurement Example 2, whereupon the element ratio of sulfur to carbon was determined to be below 0.01.

The performance in dispersibility of the Graphene Nanoplatelets was measured according to Measurement Example 3, whereupon the sedimentation was observed after 2 hours.

[Preparation of Electrode for Lithium Ion Battery]

An electrode for a lithium ion battery containing the Graphene Nanoplatelets was prepared in the same manner as in Example 1 and the discharge capacity was measured according to Measurement Example 4, whereupon it was determined to be 78 mAh/g.

The results are shown in Table 1.

Comparative Example 7

[Preparation Method of Graphene Composition]

After 5 g of Graphene Nanoplatelets (model number M-5, XG Sciences, Inc.) and 5 g of thiourea were mixed using a planetary ball mill, the mixture was washed with water and dried to obtain a graphene composition.

[Physical Properties and Performance of Graphene Composition]

The electrical conductivity of the graphene composition was measured according to Measurement Example 1, whereupon the electrical conductivity of the graphene composition was determined to be $4.23 \times 10^2$ S/m.

The element ratio of the graphene composition was measured according to Measurement Example 2, whereupon the element ratio of sulfur to carbon was determined to be 0.16.

The performance in dispersibility of the graphene composition was measured according to Measurement Example 3, whereupon it was allowed to be stably dispersed even after 30 days and no sedimentation was observed.

[Preparation of Electrode for Lithium Ion Battery]

By using the prepared graphene composition, an electrode was prepared in the same manner as in Example 1 and the discharge capacity was measured according to Measurement Example 4, whereupon it was determined to be 42 mAh/g.

The results are shown in Table 1.

TABLE 1

| | Graphene conductivity (S/cm) | | Sulfur/Carbon ratio | Dispersibility | Discharge capacity (mAh/g) |
| --- | --- | --- | --- | --- | --- |
| | Before reduction | After reduction | | | |
| Example 1 | $8.70 \times 10^{-4}$ | $9.01 \times 10^{+2}$ | $1.04 \times 10^{-1}$ | >30 days | 143 |
| Example 2 | $8.70 \times 10^{-4}$ | $3.85 \times 10^{+3}$ | $7.80 \times 10^{-2}$ | >30 days | 151 |
| Example 3 | $8.70 \times 10^{-4}$ | $3.71 \times 10^{+3}$ | $7.60 \times 10^{-2}$ | >30 days | 150 |
| Example 4 | $8.70 \times 10^{-4}$ | $1.98 \times 10^{+3}$ | $5.30 \times 10^{-2}$ | >30 days | 141 |
| Example 5 | — | $3.56 \times 10^{+3}$ | $6.40 \times 10^{-2}$ | 25 days | 135 |
| Comparative Example 1 | $8.70 \times 10^{-4}$ | $1.25 \times 10^{+3}$ | $2.10 \times 10^{-2}$ | 7 days | 91 |
| Comparative Example 2 | $8.70 \times 10^{-4}$ | $1.14 \times 10^{+3}$ | $2.30 \times 10^{-2}$ | 6 days | 90 |

TABLE 1-continued

| | Graphene conductivity (S/cm) | | Sulfur/Carbon ratio | Dispersibility | Discharge capacity (mAh/g) |
|---|---|---|---|---|---|
| | Before reduction | After reduction | | | |
| Comparative Example 3 | $8.70 \times 10^{-4}$ | $5.89 \times 10^{+3}$ | <0.01 | 6 hours | 90 |
| Comparative Example 4 | $8.70 \times 10^{-4}$ | $6.90 \times 10^{+3}$ | $1.30 \times 10^{-2}$ | 1 day | 113 |
| Comparative Example 5 | — | $1.59 \times 10^{+3}$ | <0.01 | 6 hours | 85 |
| Comparative Example 6 | — | $1.43 \times 10^{+4}$ | <0.01 | 2 hours | 78 |
| Comparative Example 7 | — | $4.23 \times 10^{+2}$ | $1.60 \times 10^{-1}$ | >30 days | 42 |

As stated above, since the graphene composition according to the present invention has good dispersibility and high electrical conductivity, it demonstrates high performance as a conductive additive and high discharge capacity is attained. Since a graphene composition with an element ratio of sulfur to carbon lower than that in the range of the present invention has high electrical conductivity but has poor dispersibility, the discharge capacity is low. Since a graphene composition with an element ratio of sulfur to carbon higher than that in the range of the present invention has good dispersibility but has low electrical conductivity, the discharge capacity is low.

A graphene composition containing thiourea has a little lower electrical conductivity than that of a graphene composition containing no thiourea. This is because the electrical conductivity is affected by allowing thiourea and a denatured material thereof to stick to a graphene surface. However, the electrical conductivity of graphene reduced in the presence of thiourea is far higher than that of amorphous carbon and it has sufficient electrical conductivity as a conductive additive. The graphene composition according to the present invention shows good performance in both dispersibility and electrical conductivity. Thus, high battery performance can be attained by using it as a conductive additive for a lithium ion battery electrode.

The invention claimed is:

1. A graphene composition containing graphene, thiourea and elemental sulfur, the element ratio of sulfur to carbon measured in X-ray photoelectron spectroscopy measurement being 0.04 or more and 0.12 or less and the elemental sulfur content in the graphene composition is 0.01 or more and 0.1 or less relative to the carbon component, wherein the thiourea is adsorbed on the surface of the graphene.

2. An electrode for a lithium ion battery, comprising the graphene composition according to claim 1, an electrode active material and a binder.

3. A method for producing the graphene composition according to claim 1, comprising a step of reducing a graphite oxide at 20° C. or higher and 60° C. or lower in the presence of thiourea.

4. The method for producing graphene composition according to claim 3, wherein the graphite oxide is reduced at a weight ratio of thiourea to the graphite oxide of 0.5 or more and 4 or less.

5. An electrode for a lithium ion battery, comprising the graphene composition produced by the method for producing graphene composition according to claim 3, an electrode active material and a binder.

6. An electrode for a lithium ion battery, comprising the graphene composition produced by the method for producing graphene composition according to claim 4, an electrode active material and a binder.

* * * * *